United States Patent
Chao

(10) Patent No.: US 10,644,534 B2
(45) Date of Patent: May 5, 2020

(54) SOLAR MOBILE ELECTRONIC DEVICE

(71) Applicant: Chen-Hsiang Chao, Taichung (TW)

(72) Inventor: Chen-Hsiang Chao, Taichung (TW)

( * ) Notice: Subject to any disclaimer, the term of this patent is extended or adjusted under 35 U.S.C. 154(b) by 172 days.

(21) Appl. No.: 15/937,848

(22) Filed: Mar. 27, 2018

(65) Prior Publication Data

US 2019/0305584 A1 Oct. 3, 2019

(51) Int. Cl.
*H02J 7/35* (2006.01)
*H02S 40/38* (2014.01)

(52) U.S. Cl.
CPC ............. *H02J 7/35* (2013.01); *H02S 40/38* (2014.12)

(58) Field of Classification Search
CPC ..... H02J 7/35; H02J 3/383; H02J 1/00; H02S 40/38
See application file for complete search history.

(56) References Cited

U.S. PATENT DOCUMENTS

2018/0090796 A1* 3/2018 Petrella ................. H02S 10/40

* cited by examiner

*Primary Examiner* — Carlos Amaya
(74) *Attorney, Agent, or Firm* — Leong C. Lei

(57) ABSTRACT

A solar mobile electronic device includes: a power supply device, including a battery in electric connection with a first voltage display module and outputting a first output voltage, the first voltage display module measuring and displaying the magnitude of the first output voltage; a solar power supply device, including at least one solar panel and a voltage display and control device, the solar panel in electric connection with the voltage display and control device and converting solar energy to a second output voltage, the voltage display and control device configured with a second voltage adjusting module and a second voltage display and control module also in electric connection with the first voltage display module, the second voltage display and control module controlling and displaying the magnitude of the second output voltage through the second voltage adjusting module and having a dynamic comparison unit adapted to set a predetermined voltage value.

4 Claims, 2 Drawing Sheets

SOLAR MOBILE ELECTRONIC DEVICE

(A) TECHNICAL FIELD OF THE INVENTION

The present invention relates to a mobile electronic device, and more particularly to a solar mobile electronic device in combination with solar energy, capable of widely used in sea, land and air mobile electronic facilities.

(B) DESCRIPTION OF THE PRIOR ART

Among current solar mobile electronic devices, there are devices adapted to convert solar energy to electric energy used to charge a battery. However, current charging systems will still charge the battery when it is in the middle of power supply, which not only affect the stability of the power supply of the battery but will decrease the battery life

SUMMARY OF THE INVENTION

To control the charge and discharge timing of a battery effectively and extend battery life so as to overcome the defects mentioned above, the present invention is proposed.

The present invention proposes a solar mobile electronic device, adapted to supply power to at least one electric apparatus, including: a power supply device, including a battery in electric connection with a first voltage display module and outputting a first output voltage, the first voltage display module measuring and displaying the magnitude of the first output voltage; a solar power supply device, including at least one solar panel and a voltage display and control device, the solar panel in electric connection with the voltage display and control device and converting solar energy to a second output voltage, the voltage display and control device configured with a second voltage adjusting module and a second voltage display and control module also in electric connection with the first voltage display module, the second voltage display and control module controlling and displaying the magnitude of the second output voltage through the second voltage adjusting module and having a dynamic comparison unit adapted to set a predetermined voltage value.

According to the solar mobile electronic device mentioned above, when the voltage of the battery is lower than the predetermined voltage value, the second output voltage charges the battery, and when the voltage of the battery is larger than the predetermined voltage value, the second output voltage stops charging the battery.

According to the solar mobile electronic device mentioned above, the battery is a lead battery or lithium battery.

According to the solar mobile electronic device mentioned above, the second voltage adjusting module has a boost unit, step-down unit and voltage stabilizing unit, and the magnitude of the second output voltage is adjusted by means of the cooperation of the boost unit, step-down unit and voltage stabilizing unit.

According to the solar mobile electronic device mentioned above, it is able to be used in sea, land and air mobile electronic facilities such as automobiles, ships or unmanned aerial vehicles (UAV).

With the structures mentioned above, the solar mobile electronic device of the present invention can precisely switch the battery charge and discharge timing, preventing the battery from being charged at the same time when in use, ensuring the power supply stabilization of the battery, and in accordance with different kinds of batteries, capable of adjusting the magnitude of the second output voltage and then charging each kind of battery, thereby extending the use life of the battery.

DETAILED DESCRIPTION OF THE PREFERRED EMBODIMENTS

Figure 1:
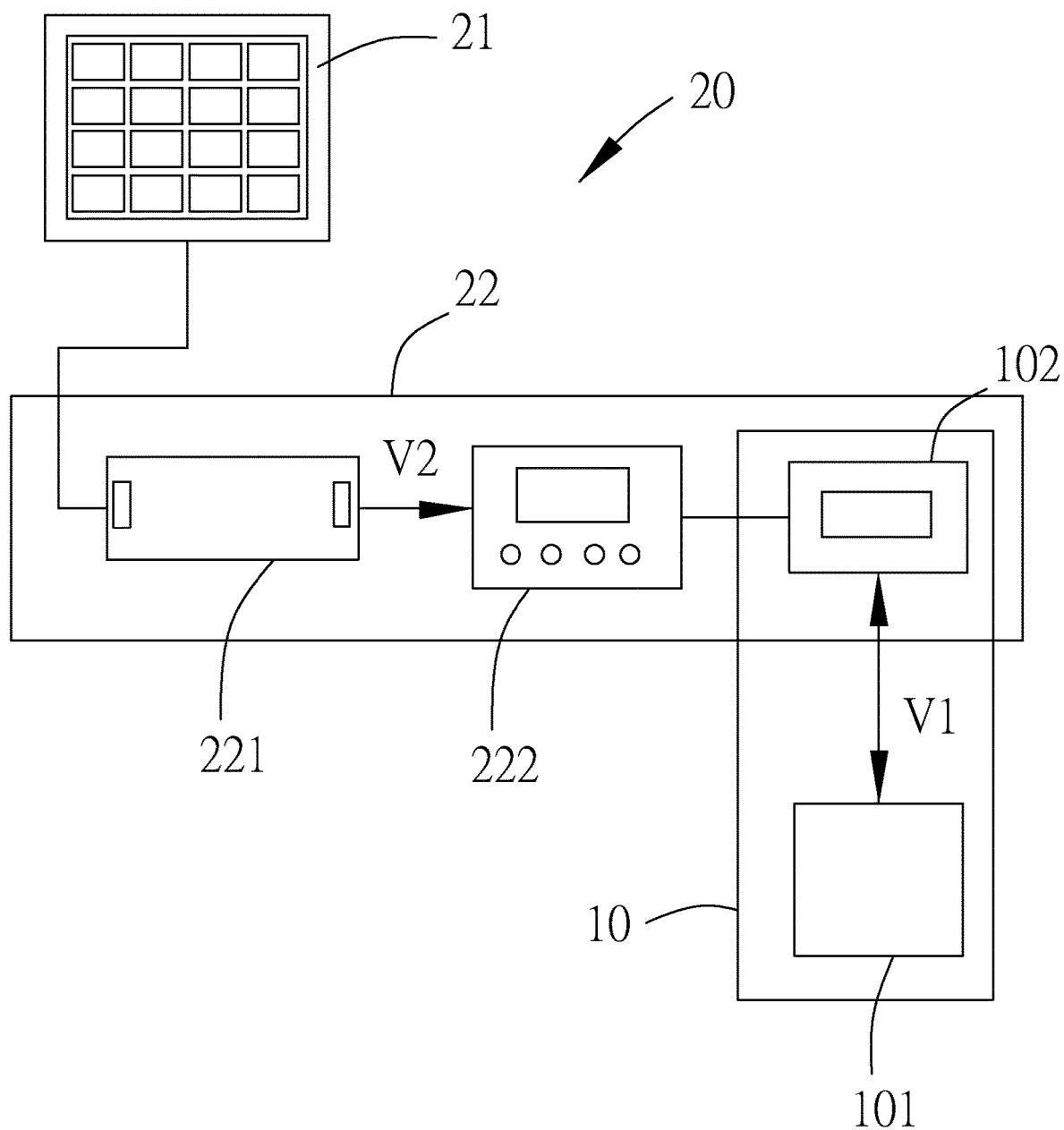
FIG. 1 is a structural block diagram of the present invention.

Referring to FIG. 1, a solar mobile electronic device includes: a power supply device 10, including a battery 101 in electric connection with a first voltage display module 102 and outputting a first output voltage V1, and the first voltage display module 102 adapted to display the value of the first output voltage V1; and a solar power supply device 20, including at least one solar panel 21 and a voltage display and control device 22 in electric connection with the solar panel 21, the solar panel 21 converting solar energy to a second output voltage V2 and outputting it, the voltage display and control device 22 configured with a second voltage adjusting module 221 and second voltage display and control module 222.

The second adjusting module has the effects of adjusting the magnitude of the second voltage V2 and stabilizing it.

The second voltage display and control module 222 is in electric connection with the second voltage adjusting module 221, the second voltage display and control module 222 can control the magnitude of the second output voltage V2 through the second voltage adjusting module 221, the second voltage display and control module 222 has a dynamic comparison unit 2221 adapted to set a predetermined voltage value.

The second output voltage V2 charges the battery 10 when the voltage of the battery 101 is smaller than the predetermined voltage value, and the second output voltage V2 stops charging the battery 101 when the voltage of the battery 101 is larger than the predetermined voltage value.

Figure 2:
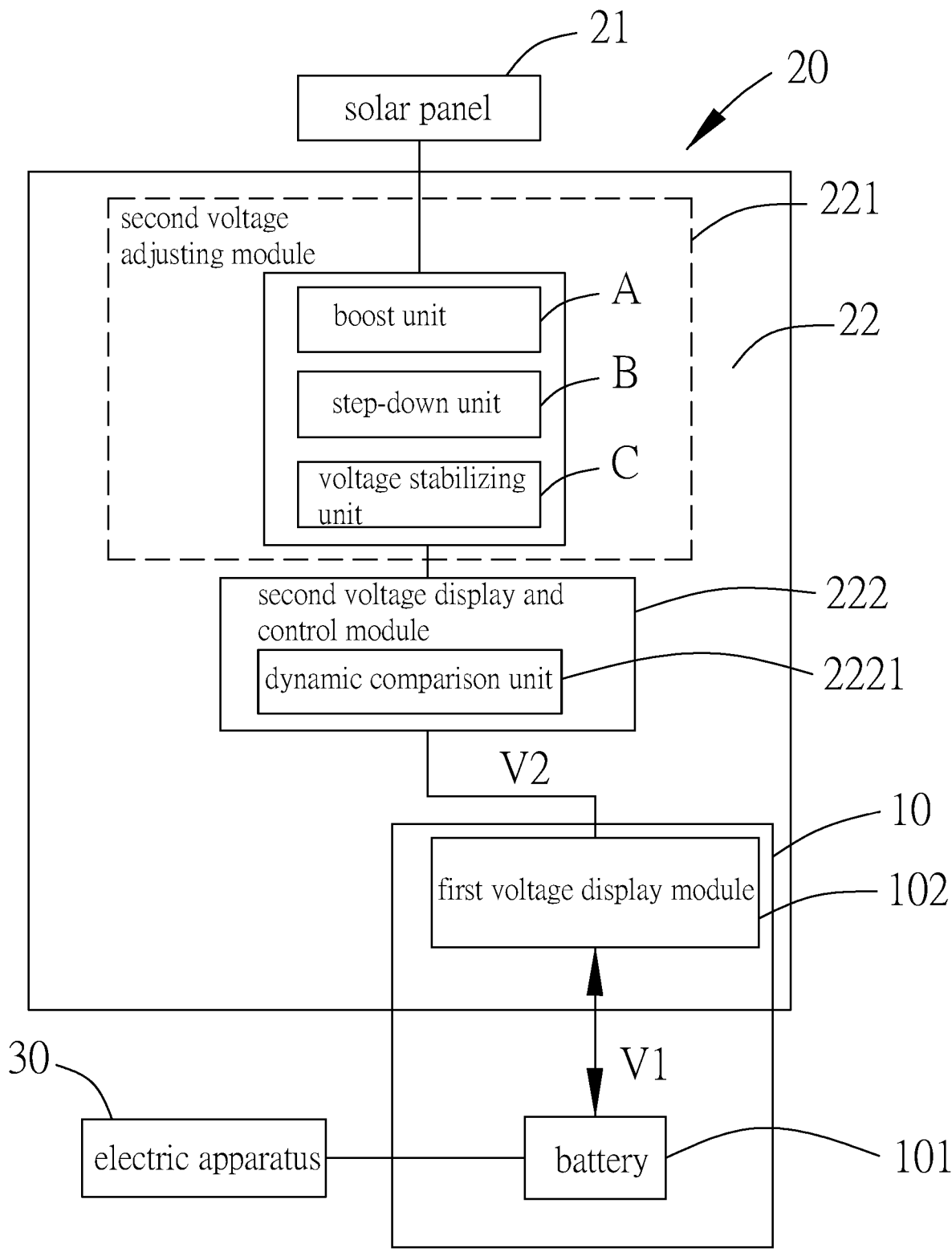
FIG. 2 is a block diagram of the units of the present invention in detail.

Referring to FIG. 2, the second voltage adjusting module 221 is configured with a boost unit A, step-down unit B and voltage stabilizing unit C, through the cooperation of which the magnitude of the second output voltage V2 can be adjusted.

The battery 10 may be a lead battery or lithium battery.

The solar mobile electronic device can be widely used in sea, land or air mobile electronic facilities, such as automobiles, ships and unmanned aerial vehicles (UAV).

I claim:

1. A solar mobile electronic device, adapted to supply power to at least one electric apparatus, comprising:
    a power supply device, comprising a battery in electric connection with a first voltage display module and outputting a first output voltage, said first voltage display module measuring and displaying the magnitude of said first output voltage;
    a solar power supply device, comprising at least one solar panel and a voltage display and control device, said solar panel in electric connection with said voltage display and control device and converting solar energy to a second output voltage, said voltage display and control device configured with a second voltage adjusting module and a second voltage display and control module also in electric connection with said first voltage display module, said second voltage display and control module controlling and displaying the magnitude of said second output voltage through said second voltage adjusting module and having a dynamic comparison unit adapted to set a predetermined voltage value, wherein, when the voltage of said battery is lower than said predetermined voltage value, said second output voltage charges said battery, and when the voltage of said battery is larger than said predetermined voltage value, said second output voltage stops charging said battery.

2. The solar mobile electronic device according to claim 1, wherein said battery is a lead battery or lithium battery.

3. The solar mobile electronic device according to claim 1, wherein said second voltage adjusting module has a boost unit, step-down unit and voltage stabilizing unit, and the magnitude of said second output voltage is adjusted by means of the cooperation of said boost unit, step-down unit and voltage stabilizing unit.

4. The solar mobile electronic device according to claim 1, capable of being used in sea, land and air mobile electronic facilities.

\* \* \* \* \*